US011604366B2

(12) United States Patent
Ouderkirk et al.

(10) Patent No.: US 11,604,366 B2
(45) Date of Patent: Mar. 14, 2023

(54) HEAD-MOUNTED DISPLAY DEVICES WITH REMOVABLE PRESCRIPTION LENSES

(71) Applicant: META PLATFORMS TECHNOLOGIES, LLC, Menlo Park, CA (US)

(72) Inventors: Andrew John Ouderkirk, Redmond, WA (US); Robin Sharma, Redmond, WA (US); Karol Constantine Hatzilias, Kenmore, WA (US); Sheng Ye, Redmond, WA (US); Sebastian Sztuk, Menlo Park, CA (US); Kirk Erik Burgess, Newark, CA (US); Javier San Agustin Lopez, Menlo Park, CA (US); Neeraj Choubey, Belmont, CA (US); Bo Asp Andersen, Seattle, WA (US); Kurt Jenkins, Sammamish, WA (US)

(73) Assignee: META PLATFORMS TECHNOLOGIES, LLC, Menlo Park, CA (US)

(*) Notice: Subject to any disclaimer, the term of this patent is extended or adjusted under 35 U.S.C. 154(b) by 0 days.

(21) Appl. No.: 16/797,566

(22) Filed: Feb. 21, 2020

(65) Prior Publication Data
US 2021/0263342 A1 Aug. 26, 2021

(51) Int. Cl.
*G02C 9/00* (2006.01)
*G02B 27/01* (2006.01)
*G06F 3/01* (2006.01)
*B32B 27/08* (2006.01)
*B32B 7/12* (2006.01)

(52) U.S. Cl.
CPC ............... *G02C 9/00* (2013.01); *B32B 7/12* (2013.01); *B32B 27/08* (2013.01); *G02B 27/0172* (2013.01); *G06F 3/013* (2013.01); *B32B 2307/30* (2013.01); *B32B 2457/202* (2013.01); *B32B 2551/00* (2013.01)

(58) Field of Classification Search
CPC .. G02C 9/00; B32B 7/12; B32B 27/08; B32B 2457/202; B32B 2551/00; G02B 27/0172
USPC .......................................................... 345/8
See application file for complete search history.

(56) References Cited

U.S. PATENT DOCUMENTS

| 4,286,047 | A | 8/1981 | Bennett et al. |
| 5,380,387 | A | 1/1995 | Salamon et al. |
| 6,627,309 | B2 | 3/2003 | Stebbings et al. |
| 9,827,739 | B2 | 11/2017 | Rule et al. |
| 2005/0054785 | A1 | 10/2005 | Stebbings et al. |
| 2007/0177275 | A1* | 8/2007 | McGuire ............ G02B 27/0172 359/630 |

(Continued)

FOREIGN PATENT DOCUMENTS

| CN | 107418465 A | 12/2017 |
| KR | 101906805 B1 | 10/2018 |

*Primary Examiner* — Kwin Xie
(74) *Attorney, Agent, or Firm* — Morgan, Lewis & Bockius LLP

(57) ABSTRACT

An optical assembly includes an optically transparent substrate and a first lens removably coupled with the optically transparent substrate by one or more adhesive layers. The one or more adhesive layers are positioned between the optically transparent substrate and the first lens. Also disclosed are an eye-tracker and a display device, each of which includes the optical assembly.

20 Claims, 9 Drawing Sheets

(56) References Cited

U.S. PATENT DOCUMENTS

| | | | |
|---|---|---|---|
| 2015/0312560 A1* | 10/2015 | Deering | A61F 2/1602 |
| | | | 345/1.3 |
| 2018/0133504 A1* | 5/2018 | Malchano | A61B 5/16 |
| 2018/0322845 A1* | 11/2018 | Machida | G02F 1/1523 |
| 2019/0004325 A1* | 1/2019 | Connor | G02B 27/0172 |
| 2019/0285796 A1* | 9/2019 | Waldern | G02B 27/0081 |
| 2019/0304949 A1 | 10/2019 | Rusli | |
| 2020/0355923 A1* | 11/2020 | Potnis | G02B 27/14 |
| 2020/0409183 A1* | 12/2020 | Saylor | G02B 1/041 |

* cited by examiner

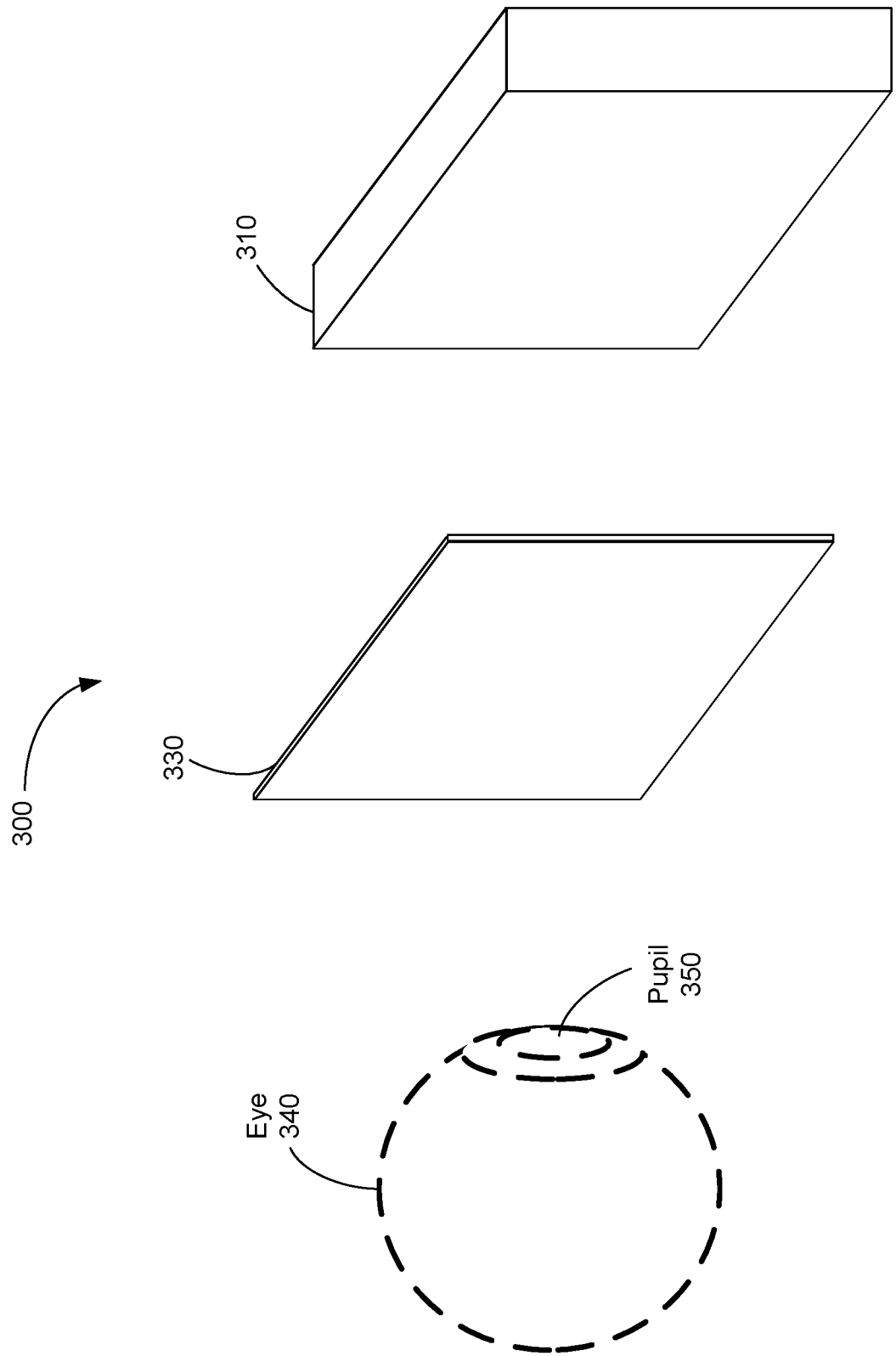

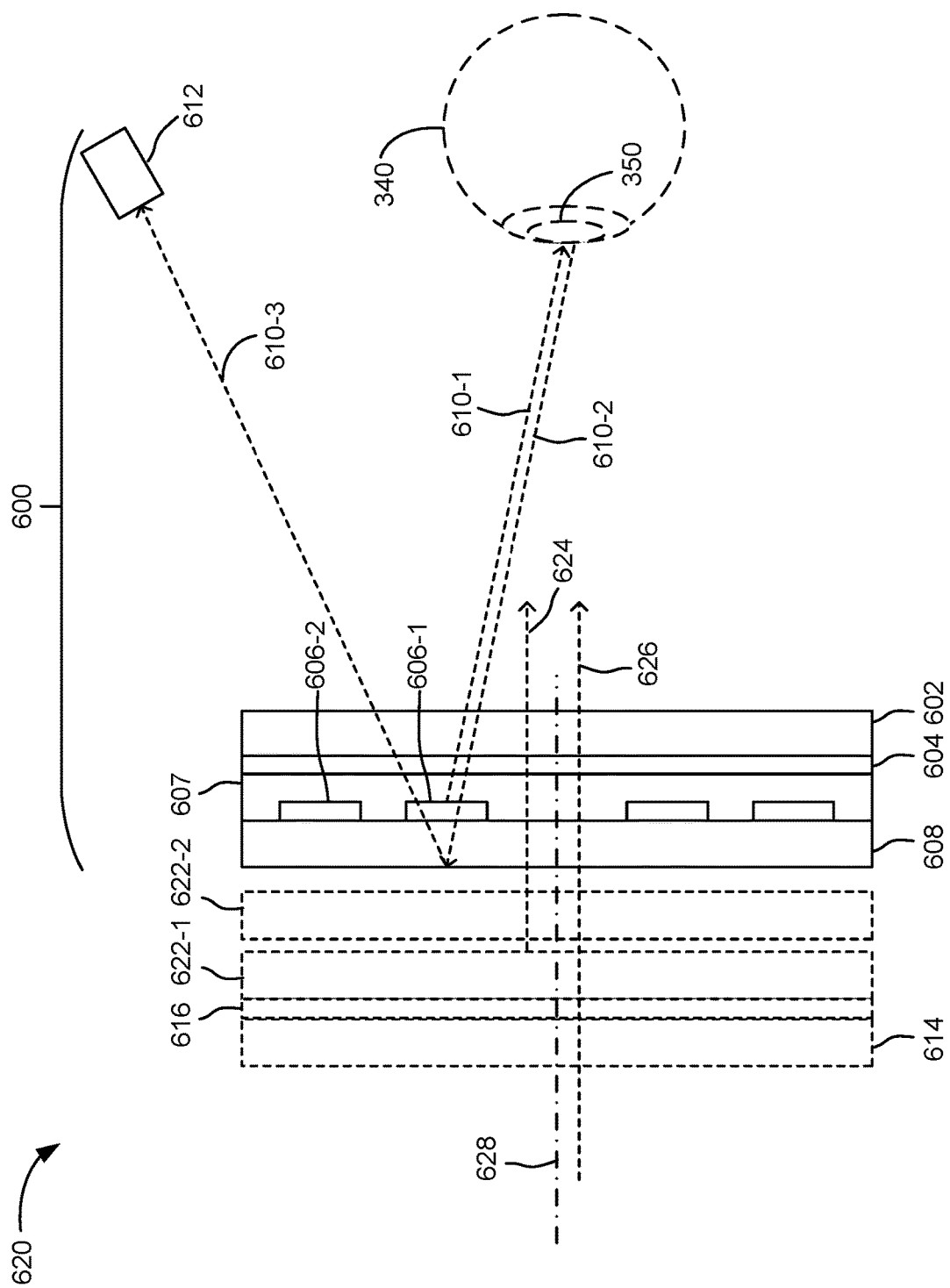

HEAD-MOUNTED DISPLAY DEVICES WITH REMOVABLE PRESCRIPTION LENSES

TECHNICAL FIELD

This relates generally to head-mounted display devices, and more specifically to head-mounted display devices with prescription lenses.

BACKGROUND

Head-mounted display devices (also called herein head-mounted displays) are gaining popularity as means for providing visual information to a user. For example, the head-mounted display devices are used for virtual reality, mixed reality, and augmented reality operations.

Some users of head-mounted display devices require prescription lenses (e.g., for having myopia), and in some cases, it is beneficial to have prescription lenses integrated into head-mounted display devices so that such users do not need to wear separate spectacles or contact lenses before putting on head-mounted display devices. However, the prescription lenses may need to be replaced, for example, if a user's prescription changes or the display device is transferred to another user. Replacing an integrated lens can be challenging.

SUMMARY

Several challenges in using prescription lenses, including the above-discussed challenge, can be addressed by the disclosed optical components, assemblies, devices, and systems and methods.

In accordance with some embodiments, an optical assembly includes an optically transparent substrate and a first lens. The first lens is removably coupled with the optically transparent substrate by one or more adhesive layers positioned between the optically transparent substrate and the first lens.

In accordance with some embodiments, an eye tracking device includes the optical assembly described herein. The optically transparent substrate of the optical assembly includes one or more illumination sources configured to provide light to an eye of a user. The eye tracking device also includes a detector configured to receive light reflected off the eye of the user for determining a position of a pupil of the eye of the user.

In accordance with some embodiments, a display device includes a display panel and the eye tracking device described herein. The eye tracking device also includes an optical combiner configured to transmit light from the display panel toward the eye of the user and redirect light reflected off the eye of the user toward the detector.

In accordance with some embodiments, a method includes separating the first lens from the optical assembly described herein by separating the first lens from the optically transparent substrate. The method also includes removably coupling a third lens that is distinct from the first lens with the optically transparent substrate.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 3 is an isometric view of a display device in accordance with some embodiments.

FIG. 6 is a schematic illustration of a display device with an eye tracking device in accordance with some embodiments.

Figure 1:
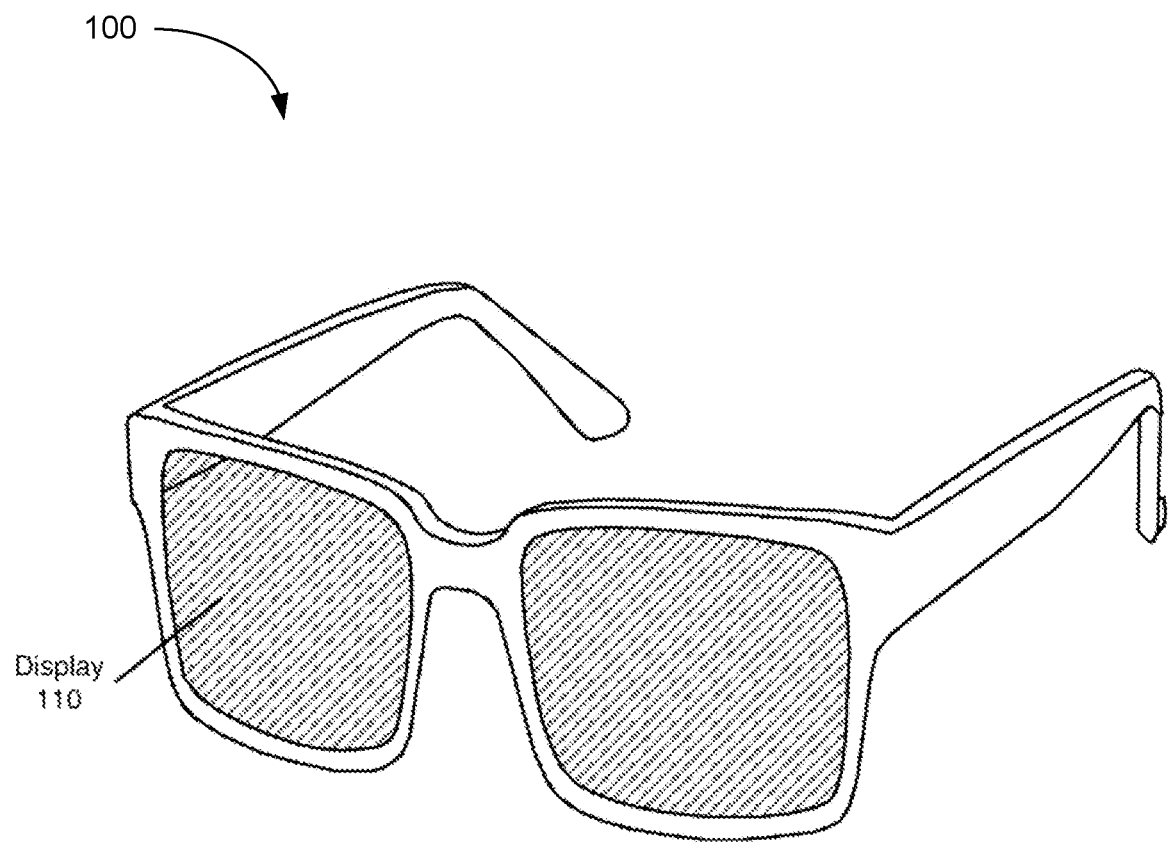
FIG. 1 is a perspective view of a display device in accordance with some embodiments.

These figures are not drawn to scale unless indicated otherwise.

DETAILED DESCRIPTION

Conventional head-mounted display devices require users to wear their prescription glasses in combination with the head-mounted display devices. Such combinations may feel uncomfortable and heavy for the users. Head-mounted display devices with integrated prescription lenses could provide a more comfortable user experience. However, it is possible that such integrated prescription lenses need to be replaced. For example, a user's prescription may change with time, or the display device may be used by another user. Therefore, there is a need for head-mounted display devices with removable and replaceable prescription lenses.

The present disclosure provides for optical assemblies with removable prescription lenses for head-mounted display devices. Also disclosed are methods for removing such prescription lenses from the optical assemblies. An assembly includes a removable prescription lenses coupled to an optical substrate with an adhesive layer. The layer of adhesive material enables coupling of the prescription lens to the optical substrate without significantly increasing the size and weight of the optical assembly. The adhesive layer may be modified for easy removal of the prescription lens without causing any damage to the prescription lens or the optical substrate. The adhesive layer positioned between the optical substrate and the removable lens may also eliminate air gaps in the optical assembly thereby reducing reflections and optical artifacts arising from the reflections. The present disclosure also provides for head-mounted display devices with eye tracking devices integrated with removable prescription lenses.

Reference will now be made to embodiments, examples of which are illustrated in the accompanying drawings. In the following description, numerous specific details are set forth in order to provide an understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are used only to distinguish one element from another. For example, a first retarder could be termed a second retarder, and, similarly, a second retarder could be termed a first retarder, without departing from the scope of the various described embodiments. The first retarder and the second retarder are both retarders, but they are not the same retarder.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "exemplary" is used herein in the sense of "serving as an example, instance, or illustration" and not in the sense of "representing the best of its kind."

FIG. 1 illustrates display device 100 in accordance with some embodiments. In some embodiments, display device 100 is configured to be worn on a head of a user (e.g., by having the form of spectacles or eyeglasses, as shown in FIG. 1) or to be included as part of a helmet that is to be worn by the user. When display device 100 is configured to be worn on a head of a user or to be included as part of a helmet, display device 100 is called a head-mounted display. Alternatively, display device 100 is configured for placement in proximity of an eye or eyes of the user at a fixed location, without being head-mounted (e.g., display device 100 is mounted in a vehicle, such as a car or an airplane, for placement in front of an eye or eyes of the user). As shown in FIG. 1, display device 100 includes display 110. Display 110 is configured for presenting visual contents (e.g., augmented reality contents, virtual reality contents, mixed reality contents, or any combination thereof) to a user.

Figure 2:
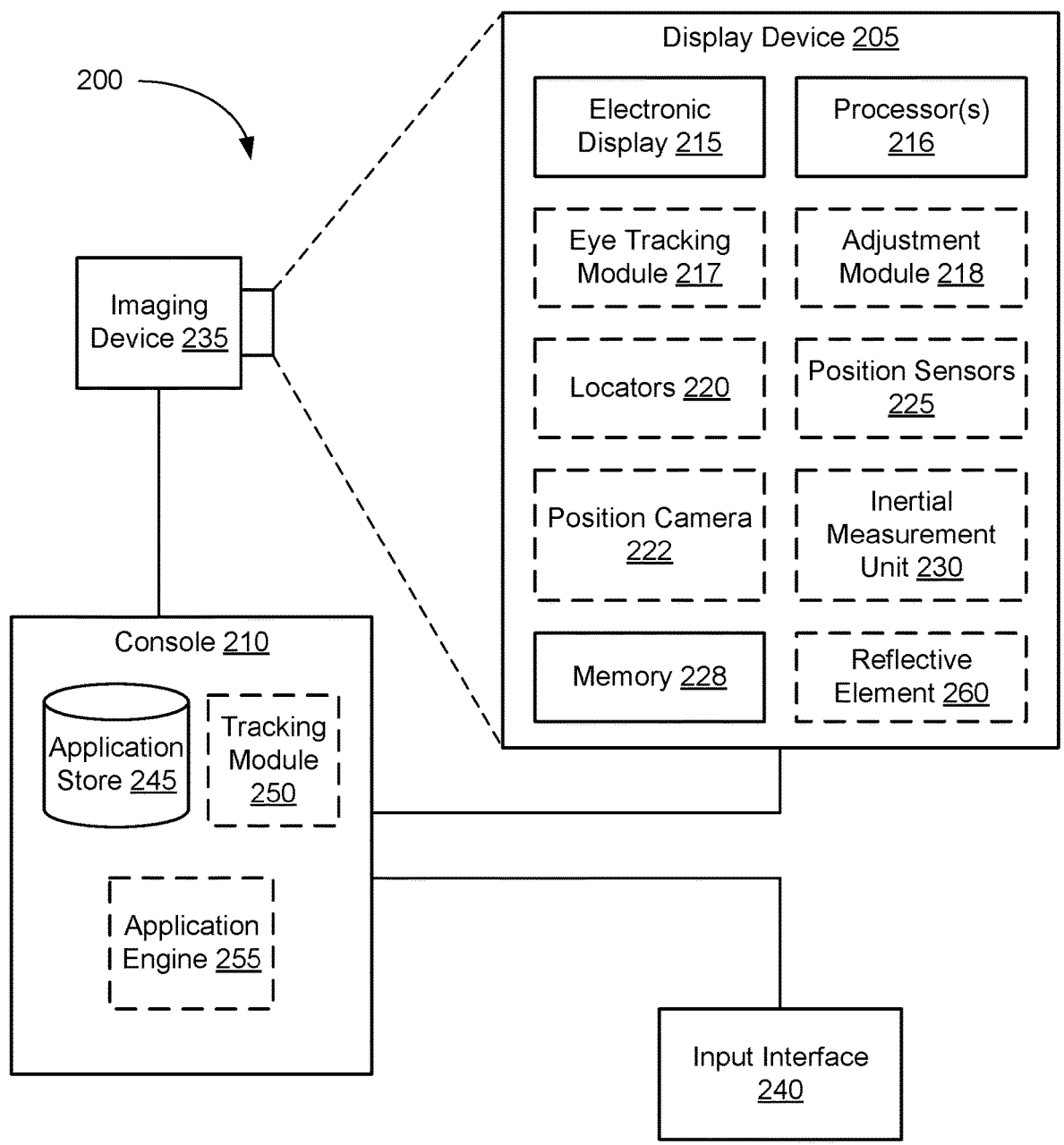
FIG. 2 is a block diagram of a system including a display device in accordance with some embodiments.

In some embodiments, display device 100 includes one or more components described herein with respect to FIG. 2. In some embodiments, display device 100 includes additional components not shown in FIG. 2.

FIG. 2 is a block diagram of system 200 in accordance with some embodiments. The system 200 shown in FIG. 2 includes display device 205 (which corresponds to display device 100 shown in FIG. 1), imaging device 235, and input interface 240 that are each coupled to console 210. While FIG. 2 shows an example of system 200 including one display device 205, imaging device 235, and input interface 240, in other embodiments, any number of these components may be included in system 200. For example, there may be multiple display devices 205 each having associated input interface 240 and being monitored by one or more imaging devices 235, with each display device 205, input interface 240, and imaging devices 235 communicating with console 210. In alternative configurations, different and/or additional components may be included in system 200. For example, in some embodiments, console 210 is connected via a network (e.g., the Internet) to system 200 or is self-contained as part of display device 205 (e.g., physically located inside display device 205). In some embodiments, display device 205 is used to create mixed reality by adding in a view of the real surroundings. Thus, display device 205 and system 200 described here can deliver augmented reality, virtual reality, and mixed reality.

In some embodiments, as shown in FIG. 1, display device 205 is a head-mounted display that presents media to a user. Examples of media presented by display device 205 include one or more images, video, audio, or some combination thereof. In some embodiments, audio is presented via an external device (e.g., speakers and/or headphones) that receives audio information from display device 205, console 210, or both, and presents audio data based on the audio information. In some embodiments, display device 205 immerses a user in an augmented environment.

In some embodiments, display device 205 also acts as an augmented reality (AR) headset. In these embodiments, display device 205 augments views of a physical, real-world environment with computer-generated elements (e.g., images, video, sound, etc.). Moreover, in some embodiments, display device 205 is able to cycle between different types of operation. Thus, display device 205 operates as a virtual reality (VR) device, an augmented reality (AR) device, a mixed reality (MR) device, as glasses or some combination thereof (e.g., glasses with no optical correction, glasses optically corrected for the user, sunglasses, or some combination thereof) based on instructions from application engine 255.

Display device 205 includes electronic display 215, one or more processors 216, eye tracking module 217, adjustment module 218, one or more locators 220, one or more position sensors 225, one or more position cameras 222, memory 228, inertial measurement unit (IMU) 230, one or more reflective elements 260 or a subset or superset thereof (e.g., display device 205 with electronic display 215, one or more processors 216, and memory 228, without any other listed components). Some embodiments of display device 205 have different modules than those described here. Similarly, the functions can be distributed among the modules in a different manner than is described here.

One or more processors 216 (e.g., processing units or cores) execute instructions stored in memory 228. Memory 228 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 228, or alternately the non-volatile memory device(s) within memory 228, includes a non-transitory computer readable storage medium. In some embodiments, memory 228 or the computer readable storage medium of memory 228 stores programs, modules and data structures, and/or instructions for displaying one or more images on electronic display 215.

Electronic display 215 displays images to the user in accordance with data received from console 210 and/or processor(s) 216. In various embodiments, electronic display 215 may comprise a single adjustable display element or multiple adjustable display elements (e.g., a display for each eye of a user). In some embodiments, electronic display 215 is configured to display images to the user by projecting the images onto one or more reflective elements 260.

In some embodiments, the display element includes one or more light emission devices and a corresponding array of spatial light modulators. A spatial light modulator is an array of electro-optic pixels, opto-electronic pixels, some other array of devices that dynamically adjust the amount of light transmitted by each device, or some combination thereof. These pixels are placed behind one or more lenses. In some embodiments, the spatial light modulator is an array of liquid crystal based pixels in an LCD (a Liquid Crystal Display). Examples of the light emission devices include: an organic light emitting diode, an active-matrix organic light-emitting diode, a light emitting diode, some type of device capable of being placed in a flexible display, or some combination thereof. The light emission devices include devices that are capable of generating visible light (e.g., red, green, blue, etc.) used for image generation. The spatial light modulator is configured to selectively attenuate individual light emission devices, groups of light emission devices, or some combination thereof. Alternatively, when the light emission devices are configured to selectively attenuate individual emission devices and/or groups of light emission devices, the display element includes an array of such light emission devices without a separate emission intensity array. In some embodiments, electronic display 215 projects images to one or more reflective elements 260, which reflect at least a portion of the light toward an eye of a user.

One or more lenses direct light from the arrays of light emission devices (optionally through the emission intensity arrays) to locations within each eyebox and ultimately to the back of the user's retina(s). An eyebox is a region that is occupied by an eye of a user located proximity to display device 205 (e.g., a user wearing display device 205) for viewing images from display device 205. In some cases, the eyebox is represented as a 10 mm×10 mm square. In some embodiments, the one or more lenses include one or more coatings, such as anti-reflective coatings.

In some embodiments, the display element includes an infrared (IR) detector array that detects IR light that is retro-reflected from the retinas of a viewing user, from the surface of the corneas, lenses of the eyes, or some combination thereof. The IR detector array includes an IR sensor or a plurality of IR sensors that each correspond to a different position of a pupil of the viewing user's eye. In alternate embodiments, other eye tracking systems may also be employed. As used herein, IR refers to light with wavelengths ranging from 700 nm to 1 mm including near infrared (NIR) ranging from 750 nm to 1500 nm.

Eye tracking module 217 determines locations of each pupil of a user's eyes. In some embodiments, eye tracking module 217 instructs electronic display 215 to illuminate the eyebox with IR light (e.g., via IR emission devices in the display element).

A portion of the emitted IR light will pass through the viewing user's pupil and be retro-reflected from the retina toward the IR detector array, which is used for determining the location of the pupil. Alternatively, the reflection off the surfaces of the eye is used to also determine location of the pupil. The IR detector array scans for retro-reflection and identifies which IR emission devices are active when retro-reflection is detected. Eye tracking module 217 may use a tracking lookup table and the identified IR emission devices to determine the pupil locations for each eye. The tracking lookup table maps received signals on the IR detector array to locations (corresponding to pupil locations) in each eyebox. In some embodiments, the tracking lookup table is generated via a calibration procedure (e.g., user looks at various known reference points in an image and eye tracking module 217 maps the locations of the user's pupil while looking at the reference points to corresponding signals received on the IR tracking array). As mentioned above, in some embodiments, system 200 may use other eye tracking systems than the embedded IR one described herein.

Adjustment module 218 generates an image frame based on the determined locations of the pupils. In some embodiments, this sends a discrete image to the display that will tile subimages together thus a coherent stitched image will appear on the back of the retina. Adjustment module 218 adjusts an output (i.e. the generated image frame) of electronic display 215 based on the detected locations of the pupils. Adjustment module 218 instructs portions of electronic display 215 to pass image light to the determined locations of the pupils. In some embodiments, adjustment module 218 also instructs the electronic display to not pass image light to positions other than the determined locations of the pupils. Adjustment module 218 may, for example, block and/or stop light emission devices whose image light falls outside of the determined pupil locations, allow other light emission devices to emit image light that falls within the determined pupil locations, translate and/or rotate one or more display elements, dynamically adjust curvature and/or refractive power of one or more active lenses in the lens (e.g., microlens) arrays, or some combination thereof.

Optional locators 220 are objects located in specific positions on display device 205 relative to one another and relative to a specific reference point on display device 205. A locator 220 may be a light emitting diode (LED), a corner cube reflector, a reflective marker, a type of light source that contrasts with an environment in which display device 205 operates, or some combination thereof. In embodiments where locators 220 are active (i.e., an LED or other type of light emitting device), locators 220 may emit light in the visible band (e.g., about 500 nm to 750 nm), in the infrared band (e.g., about 750 nm to 1 mm), in the ultraviolet band (about 100 nm to 500 nm), some other portion of the electromagnetic spectrum, or some combination thereof.

In some embodiments, locators 220 are located beneath an outer surface of display device 205, which is transparent to the wavelengths of light emitted or reflected by locators 220 or is thin enough to not substantially attenuate the wavelengths of light emitted or reflected by locators 220. Additionally, in some embodiments, the outer surface or other portions of display device 205 are opaque in the visible band of wavelengths of light. Thus, locators 220 may emit light in the IR band under an outer surface that is transparent in the IR band but opaque in the visible band.

IMU 230 is an electronic device that generates calibration data based on measurement signals received from one or more position sensors 225. Position sensor 225 generates one or more measurement signals in response to motion of display device 205. Examples of position sensors 225 include: one or more accelerometers, one or more gyroscopes, one or more magnetometers, another suitable type of sensor that detects motion, a type of sensor used for error correction of IMU 230, or some combination thereof. Position sensors 225 may be located external to IMU 230, internal to IMU 230, or some combination thereof.

Based on the one or more measurement signals from one or more position sensors 225, IMU 230 generates first calibration data indicating an estimated position of display device 205 relative to an initial position of display device 205. For example, position sensors 225 include multiple accelerometers to measure translational motion (forward/back, up/down, left/right) and multiple gyroscopes to measure rotational motion (e.g., pitch, yaw, roll). In some embodiments, IMU 230 rapidly samples the measurement signals and calculates the estimated position of display device 205 from the sampled data. For example, IMU 230 integrates the measurement signals received from the accelerometers over time to estimate a velocity vector and integrates the velocity vector over time to determine an estimated position of a reference point on display device 205. Alternatively, IMU 230 provides the sampled measurement signals to console 210, which determines the first calibration data. The reference point is a point that may be used to describe the position of display device 205. While the reference point may generally be defined as a point in space; however, in practice the reference point is defined as a point within display device 205 (e.g., a center of IMU 230).

In some embodiments, IMU 230 receives one or more calibration parameters from console 210. As further discussed below, the one or more calibration parameters are used to maintain tracking of display device 205. Based on a received calibration parameter, IMU 230 may adjust one or more IMU parameters (e.g., sample rate). In some embodiments, certain calibration parameters cause IMU 230 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

Imaging device 235 generates calibration data in accordance with calibration parameters received from console 210. Calibration data includes one or more images showing observed positions of locators 220 that are detectable by imaging device 235. In some embodiments, imaging device 235 includes one or more still cameras, one or more video cameras, any other device capable of capturing images including one or more locators 220, or some combination thereof. Additionally, imaging device 235 may include one or more filters (e.g., used to increase signal to noise ratio). Imaging device 235 is configured to optionally detect light emitted or reflected from locators 220 in a field of view of imaging device 235. In embodiments where locators 220 include passive elements (e.g., a retroreflector), imaging device 235 may include a light source that illuminates some or all of locators 220, which retro-reflect the light towards the light source in imaging device 235. Second calibration data is communicated from imaging device 235 to console 210, and imaging device 235 receives one or more calibration parameters from console 210 to adjust one or more imaging parameters (e.g., focal length, focus, frame rate, ISO, sensor temperature, shutter speed, aperture, etc.).

In some embodiments, display device 205 optionally includes one or more reflective elements 260. In some embodiments, electronic display device 205 optionally includes a single reflective element 260 or multiple reflective elements 260 (e.g., a reflective element 260 for each eye of a user). In some embodiments, electronic display 215 projects computer-generated images on one or more reflective elements 260, which, in turn, reflect the images toward an eye or eyes of a user. The computer-generated images include still images, animated images, and/or a combination thereof. The computer-generated images include objects that appear to be two-dimensional and/or three-dimensional objects. In some embodiments, one or more reflective elements 260 are partially transparent (e.g., the one or more reflective elements 260 have a transmittance of at least 15%, 20%, 25%, 30%, 35%, 50%, 55%, or 50%), which allows transmission of ambient light. In such embodiments, computer-generated images projected by electronic display 215 are superimposed with the transmitted ambient light (e.g., transmitted ambient image) to provide augmented reality images.

Input interface 240 is a device that allows a user to send action requests to console 210. An action request is a request to perform a particular action. For example, an action request may be to start or end an application or to perform a particular action within the application. Input interface 240 may include one or more input devices. Example input devices include: a keyboard, a mouse, a game controller, data from brain signals, data from other parts of the human body, or any other suitable device for receiving action requests and communicating the received action requests to console 210. An action request received by input interface 240 is communicated to console 210, which performs an action corresponding to the action request. In some embodiments, input interface 240 may provide haptic feedback to the user in accordance with instructions received from console 210. For example, haptic feedback is provided when an action request is received, or console 210 communicates instructions to input interface 240 causing input interface 240 to generate haptic feedback when console 210 performs an action.

Console 210 provides media to display device 205 for presentation to the user in accordance with information received from one or more of: imaging device 235, display device 205, and input interface 240. In the example shown in FIG. 2, console 210 includes application store 245, tracking module 250, and application engine 255. Some embodiments of console 210 have different modules than those described in conjunction with FIG. 2. Similarly, the functions further described herein may be distributed among components of console 210 in a different manner than is described here.

When application store 245 is included in console 210, application store 245 stores one or more applications for execution by console 210. An application is a group of instructions, that when executed by a processor, is used for generating content for presentation to the user. Content generated by the processor based on an application may be in response to inputs received from the user via movement of display device 205 or input interface 240. Examples of applications include: gaming applications, conferencing applications, video playback application, or other suitable applications.

When tracking module 250 is included in console 210, tracking module 250 calibrates system 200 using one or more calibration parameters and may adjust one or more calibration parameters to reduce error in determination of the position of display device 205. For example, tracking module 250 adjusts the focus of imaging device 235 to obtain a more accurate position for observed locators on display device 205. Moreover, calibration performed by tracking module 250 also accounts for information received from IMU 230. Additionally, if tracking of display device 205 is lost (e.g., imaging device 235 loses line of sight of at least a threshold number of locators 220), tracking module 250 re-calibrates some or all of system 200.

In some embodiments, tracking module 250 tracks movements of display device 205 using second calibration data from imaging device 235. For example, tracking module 250 determines positions of a reference point of display device 205 using observed locators from the second calibration data and a model of display device 205. In some embodiments, tracking module 250 also determines positions of a reference point of display device 205 using position information from the first calibration data. Additionally, in some embodiments, tracking module 250 may use portions of the first calibration data, the second calibration data, or some combination thereof, to predict a future location of display device 205. Tracking module 250 provides the estimated or predicted future position of display device 205 to application engine 255.

Application engine 255 executes applications within system 200 and receives position information, acceleration information, velocity information, predicted future positions, or some combination thereof of display device 205 from tracking module 250. Based on the received information, application engine 255 determines content to provide to display device 205 for presentation to the user. For example, if the received information indicates that the user has looked to the left, application engine 255 generates content for display device 205 that mirrors the user's movement in an augmented environment. Additionally, application engine 255 performs an action within an application executing on console 210 in response to an action request received from input interface 240 and provides feedback to the user that the action was performed. The provided feedback may be visual or audible feedback via display device 205 or haptic feedback via input interface 240.

FIG. 3 is an isometric view of display device 300 in accordance with some embodiments. In some other embodiments, display device 300 is part of some other electronic display (e.g., a digital microscope, a head-mounted display device, etc.). In some embodiments, display device 300 includes light emission device 310 (e.g., an light emission device array) and an optical assembly 330, which may include one or more lenses and/or other optical components. In some embodiments, display device 300 also includes an IR detector array.

Light emission device 310 emits image light and optional IR light toward the viewing user. Light emission device 310 includes one or more light emission components that emit light in the visible light (and optionally includes components that emit light in the IR). Light emission device 310 may include, e.g., an array of LEDs, an array of microLEDs, an array of OLEDs, or some combination thereof.

In some embodiments, light emission device 310 includes an emission intensity array (e.g., a spatial light modulator) configured to selectively attenuate light emitted from light emission device 310. In some embodiments, the emission intensity array is composed of a plurality of liquid crystal cells or pixels, groups of light emission devices, or some combination thereof. Each of the liquid crystal cells is, or in some embodiments, groups of liquid crystal cells are, addressable to have specific levels of attenuation. For example, at a given time, some of the liquid crystal cells may be set to no attenuation, while other liquid crystal cells may be set to maximum attenuation. In this manner, the emission intensity array is able to provide image light and/or control what portion of the image light is passed to the optical assembly 330. In some embodiments, display device 300 uses the emission intensity array to facilitate providing image light to a location of pupil 350 of eye 340 of a user, and minimize the amount of image light provided to other areas in the eyebox.

The optical assembly 330 includes one or more lenses (e.g., one or more prescription lenses). The one or more lenses in optical assembly 330 receive modified image light (e.g., attenuated light) from light emission device 310, and direct the modified image light to a location of pupil 350. The optical assembly 330 may include additional optical components, such as color filters, mirrors, etc.

An optional IR detector array detects IR light that has been retro-reflected from the retina of eye 340, a cornea of eye 340, a crystalline lens of eye 340, or some combination thereof. The IR detector array includes either a single IR sensor or a plurality of IR sensitive detectors (e.g., photodiodes). In some embodiments, the IR detector array is separate from light emission device array 310. In some embodiments, the IR detector array is integrated into light emission device array 310.

In some embodiments, light emission device 310 including an emission intensity array make up a display element. Alternatively, the display element includes light emission device 310 (e.g., when light emission device array 310 includes individually adjustable pixels) without the emission intensity array. In some embodiments, the display element additionally includes the IR array. In some embodiments, in response to a determined location of pupil 350, the display element adjusts the emitted image light such that the light output by the display element is refracted by one or more lenses toward the determined location of pupil 350, and not toward other locations in the eyebox.

In some embodiments, display device 300 includes one or more broadband sources (e.g., one or more white LEDs) coupled with a plurality of color filters, in addition to, or instead of, light emission device 310.

Figure 4A:
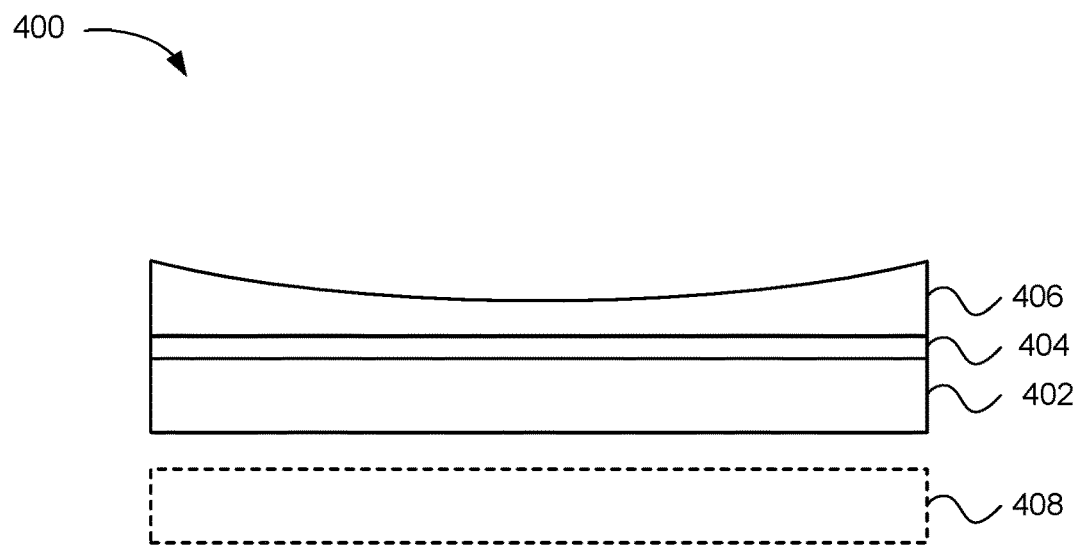
FIGS. 4A and 4B are schematic diagrams illustrating an optical assembly with a removable lens in accordance with some embodiments.
Figure 4B:
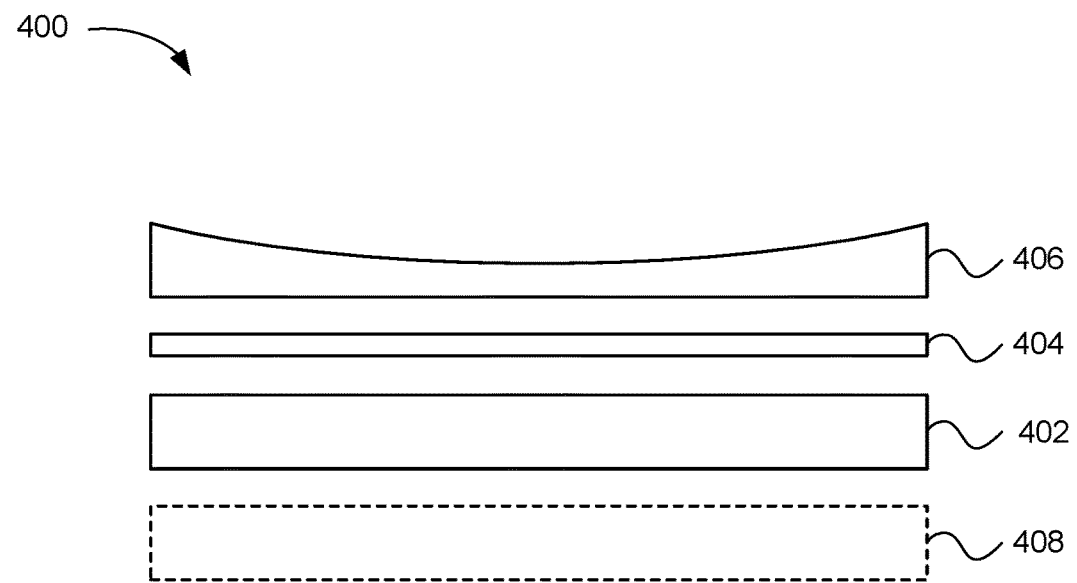

FIGS. 4A and 4B are schematic diagrams illustrating optical assembly 400 with removable lens 406 in accordance with some embodiments. Optical assembly 400 includes removable lens 406, substrate 402, and adhesive layer 404 stacked together so that adhesive layer 404 is positioned between removable lens 406 and substrate 402. In some embodiments, substrate 402 and removable lens 406 are in direct contact with adhesive layer 404. In some embodiments, one or more layers (e.g., an optical coating) are located between substrate 402 and adhesive layer 404. In such embodiments, the one or more layers are typically integrated with substrate 402. In some embodiments, one or more layers (e.g., an optical coating) are located between removable lens 406 and adhesive layer 404. In such embodiments, the one or more layers are typically integrated with removable lens 406.

As used herein, lens 406 is deemed to be removable when the combination of lens 406 firmly coupled with substrate 402 by adhesive layer 404 (so that the distance from lens 406 and substrate 402 is maintained) can be placed in a state (e.g., based on particular illumination, temperature, etc.) so that lens 406 may be separated from substrate 402 (or a distance between lens 406 and substrate 402 may be increased) without inducing damage to lens 406 and substrate 402. For example, the combination of lens 406, adhesive layer 404, and substrate 402 may be placed in a state so that lens 406 may be separated from adhesive layer 404 with a force below a threshold force (e.g., a force that would cause damage to lens 406 or substrate 402). In some embodiments, lens 406 is deemed to be removable when the combination of lens 406 firmly coupled with substrate 402 by adhesive layer 404 can be placed in a state so that lens 406 may be separated from substrate 402 without inducing damage to a center region of lens 406 and a center region of substrate 402 (e.g., a peripheral region of lens 406 or a peripheral of substrate 402 may sustain damage during separation of lens 406 from substrate 402).

In some embodiments, optical assembly 400 is prepared by providing adhesive layer 404 between substrate 402 and removable lens 406. For example, adhesive layer 404 is applied on a surface of substrate 402 and removable lens 406 is brought in contact with adhesive layer 404 on the surface of substrate 402 (e.g., substrate 402 and removable lens 406 are pressed together). Alternatively, adhesive layer 404 is applied on a surface of removable lens 406 and substrate 402 is brought in contact with adhesive layer 404 on the surface of removable lens 406. In some embodiments, adhesive layer 404 is cured (e.g., by thermal or radiation curing) while both substrate 402 and removable lens 406 are in (direct or indirect) contact with adhesive layer 404.

Adhesive layer 404 includes one or more adhesive materials (e.g., one or more layers of adhesive materials) that are optically transparent. An adhesive material herein refers to a material (e.g., a glue) that binds to a surface. For example, an adhesive material applied between two surfaces creates a bond with the surfaces thereby holding the two surfaces together. In some embodiments, adhesive layer 404 extends at least partially across surfaces of substrate 402 and removable lens 406. In some embodiments, adhesive layer 404 extends across at least 5%, 10%, 20%, 30%, 40%, 50%, 60%, 70%, 80%, 90%, or 100% of an area of removable lens 406. In some embodiments, adhesive layer 404 intersects with an optical axis of removable lens 406. In some embodiments, adhesive layer 404 is disposed on peripheral portions of removable lens 406 (e.g., adhesive layer 404 does not intersect with, and is located away from, the optical axis of removable lens 406). In some embodiments, adhesive layer 404 has a thickness ranging between 1 micrometer and 1000 micrometers, between 10 micrometers and 200 micrometers, or between 25 micrometers and 100 micrometers. In some embodiments, the one or more adhesive materials are curable (e.g., can be hardened).

In some embodiments, removable lens 406 is a prescription lens having optical parameters (e.g., diopter parameters) specific to a particular user. A prescription lens refers to a customized lens having parameters in accordance to a prescription determined by an eyewear prescriber (e.g., an optician, an optometrist, or an ophthalmologist). In FIG. 4A, removable lens 406 has a flat surface in direct contact with adhesive layer 404 and an opposing curved surface (e.g., a concave surface). Alternatively, removable lens 406 may have a curved surface facing adhesive layer 404 and adhesive layer 404 is also attachable to a curved surface of removable lens 406. For example, removable lens 406 may have a concave-concave, concave-convex, convex-convex, plano-convex, plano-concave, spherical, or aspherical shape. In some embodiments, removable lens 406 is made of a plastic (e.g., polycarbonate) or glass. In some embodiments, a surface of substrate 402 that is in direct contact with adhesive layer 404 is curved (e.g., substrate 402 is a lens having a curved surface). In some embodiments, substrate 402 provides a base curvature for users not needing optical correction, and addition of removable lens 406 and adhesive layer 404 changes the effective base curvature for users needing optical correction.

Substrate 402 is an optically transparent substrate (e.g., a substrate made of plastic or glass). In some embodiments, substrate 402 is a waveguide, an optical combiner, or a lens (e.g., a lens of optical assembly 330 described with respect to FIG. 3). In some embodiments, substrate 402 includes one or more embedded light sources for eye tracking (see, e.g., FIGS. 6-7B). In some embodiments, optical assembly 400 is optically coupled with display 408 (e.g., light emission device 310 described above with respect to FIG. 3).

FIG. 4B illustrates optical assembly 400 in a dissembled state where removable lens 406 is decoupled from substrate 402. In some embodiments, removable lens 406 is decoupled from substrate 402 such that adhesive layer 404 is no longer in direct contact with removable lens 406, as shown in FIG. 4B. In some embodiments, adhesive layer 404 is decoupled also from substrate 402. In some embodiments, removable lens 406 is decoupled from substrate 402 in a way such that adhesive layer 404 remains in direct contact with either removable lens 406 or substrate 402. For example, removable lens 406 and adhesive layer 404 may be separated from substrate 402 so that adhesive layer 404 remains in direct contact with removable lens 406.

Adhesive layer 404 is configured to hold substrate 402 and removable lens 406 together so that a position of removable lens 406 relative to substrate 402 remains constant. This is important for maintaining alignment of optical assembly 400 in a head-mounted display device. Adhesive layer 404 is also configured to enable removal of removable lens 406 from optical assembly 400 so that removal of lens 406 causes no significant damage to lens 406 and substrate 402. Removal without damages is important for, for example, reuse of substrate 402 and/or lens 406. Adhesive layer materials and respective removal methods are described below with respect to FIGS. 5A-5E.

Figure 5A:
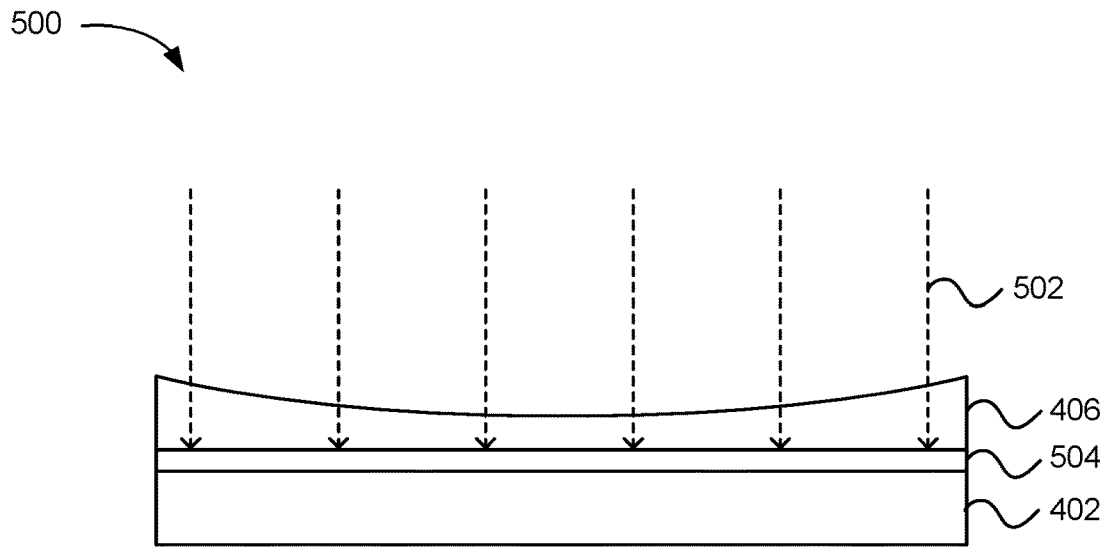
FIG. 5A is a schematic diagram illustrating an optical assembly with a removable lens in accordance with some embodiments.

FIG. 5A is a schematic diagram illustrating optical assembly 500 with removable lens 406 in accordance with some embodiments. Optical assembly 500 is similar to optical assembly 400 described above with respect to FIGS. 4A and 4B except that optical assembly 500 includes a light absorbing adhesive layer 504 between substrate 402 and 406. A light absorbing adhesive refers to a material (e.g., a polymer) that is configured to absorb light in a particular wavelength range. The absorbed light modifies properties (e.g., adhesive properties) of the light absorbing adhesive layer 504, such as reducing its tendency to bond to surfaces (e.g., surfaces of substrate 402 and/or removable lens 406) or inducing fracture within the cured light absorbing adhesive layer 504. In some embodiments, light absorbing adhesive layer 504 includes a polymeric adhesive that is capable of absorbing light. Alternatively, light absorbing adhesive layer 504 includes a polymeric adhesive and a light absorbing layer in direct contact with the polymeric adhesive so that absorption of light by the light absorbing layer changes the properties of the polymeric adhesive. In some embodiments, light absorbing adhesive layer 504 includes polymer selected from epoxy, acrylate, urethane, ester, aliphatic hydrocarbon, aromatic hydrocarbon, halogenated hydrocarbon, other polymer, other copolymer, or any combination thereof.

Removable lens 406 can be separated from optical assembly 500 by exposing removable lens 406 to light 502 (e.g., ultraviolet (UV) light). In some embodiments, light 502 is pulsed light. In some embodiments, exposing removable lens 406 to light 502 includes projecting one or more light pulses from a light source toward removable lens 406 so that the one or more light pulses are at least partially transmitted through removable lens 406 and received by light absorbing adhesive layer 504. In some embodiments, light 502 is projected to light absorbing adhesive layer 504 through substrate 402. In some cases, in response to exposure to light 502, adhesiveness of light absorbing adhesive layer 504 is reduced so that removable lens 406 can be decoupled (e.g., pulled apart by a force not exceeding a certain threshold force) from substrate 402 (e.g., as shown in FIG. 4B).

In some embodiments, light absorbing adhesive layer 504 undergoes photochemical reactions in response to exposure to radiation (e.g., light 502 being referred to as actinic radiation). The photochemical reactions cause degradation of light absorbing adhesive layer 504 thereby reducing adhesiveness of light absorbing adhesive layer 504 or inducing fracture or fragmentation in polymers by breaking chemical bonds. In some instances, inducement of photochemical reactions by radiation (e.g., UV light) is referred to as actinism. Suitable materials for light absorbing adhesive layer 504 include pressure-sensitive adhesives with ionic photoinitiators. For example, a pressure-sensitive adhesive includes a monomer that can be polymerized to a rubbery state (e.g., acrylate or methacrylate) combined with an oxirane ring-containing monomer (e.g., glycidyl acrylate, glycidyl methacrylate, or glycidyl allyl ether) and ionic photoinitiator (e.g., radiation-sensitive aromatic onium salt, onium catalyst, or diaryl halonium salt).

Figure 5B:
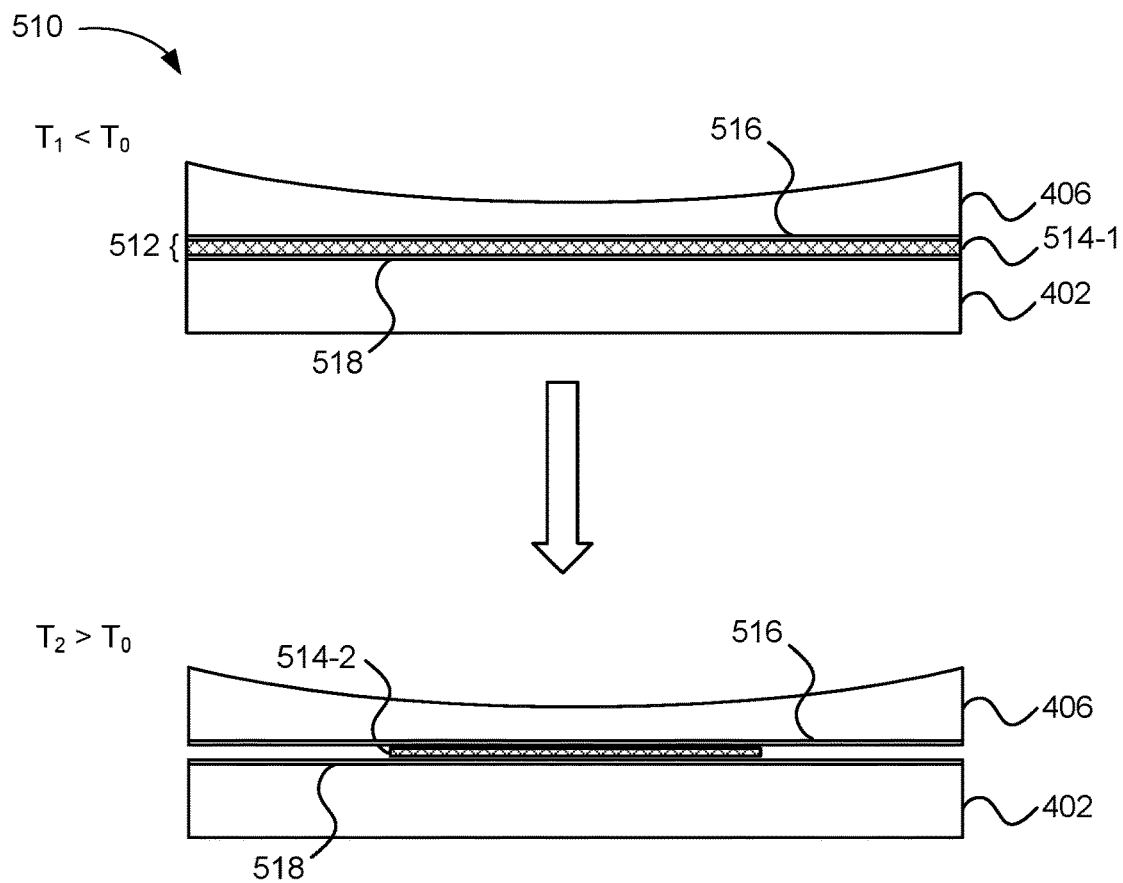
FIG. 5B is a schematic diagram illustrating an optical assembly with a removable lens in accordance with some embodiments.

FIG. 5B is a schematic diagram illustrating optical assembly 510 with removable lens 406 in accordance with some embodiments. Optical assembly 510 is similar to optical assembly 400 described above with respect to FIGS. 4A and 4B except that optical assembly 510 includes thermally sensitive adhesive layer 512 between substrate 402 and removable lens 406. In some embodiments, thermally sensitive adhesive layer 512 includes adhesive layer 516, thermoplastic layer 514, and optional additional adhesive layer 518. In some embodiments, thermoplastic layer 514 is in direct contact with, or partially embedded in, adhesive layer 516. In some embodiments, when optional additional adhesive layer 518 is used, thermoplastic layer 514 is disposed between adhesive layer 516 and additional adhesive layer 518. Thermoplastic refers to a material that changes its properties upon change of temperature. In some embodiments, thermoplastic layer 512 shrinks (e.g., decreases its volume) upon heating above a certain temperature. In some embodiments, thermoplastic layer 512 softens (e.g., becomes moldable) upon heating above a certain temperature. In some embodiments, thermoplastic layer 512 includes a layer of oriented thermoplastic. An oriented thermoplastic refers to a thermoplastic material having microstructures (e.g., fiber-like microstructures) oriented along one or more directions. For example, the thermoplastic layer may be uniaxially or biaxially oriented, or have an asymmetric orientation. In some embodiments, the oriented thermoplastic layer is selected from polyolefin (e.g., polypropylene and polyethylene), polyester (e.g., polyethylene terephthalate and polyethylene naphthalate), or polyurethane.

In some embodiments, adhesive layer 516 and optional additional adhesive layer 518 include pressure sensitive adhesive material, thermally (e.g., at a temperature above 50 Celsius degrees) or radiatively curable adhesive material, or any combination thereof. Suitable materials for adhesive layers 516 and 518 include acrylate monomers, such as ethyl methacrylate, ethyl acrylate, methyl methacrylate, acrylic acid, and any combinations thereof along with a photoinitiator such as Irgacure 819, or camphorquinone combined with N,N-dimethyltoluidine, ethyl-4-aminobenzoate or a mercaptane.

When optical assembly 510 (or thermally sensitive adhesive layer 512) is heated to a temperature above a threshold temperature, thermoplastic layer 514 shrinks, as shown in FIG. 5B. In FIG. 5B, at the room temperature $T_1$ (which is below a threshold temperature $T_0$), thermoplastic layer 514 is in a first state 514-1, in which thermoplastic layer 514 extends over the surface area of substrate 402 and removable lens 406 (e.g., thermoplastic layer 514 has a first surface area at a first temperature). Subsequently, after or during thermoplastic layer 514 is heated to a temperature $T_2$ above the threshold temperature $T_0$, thermoplastic layer 514 is in a second state 514-2, in which thermoplastic layer 514 has shrunk (e.g., thermoplastic layer 514 has a second surface area less than the first surface area at a second temperature that is greater than the first temperature). While thermoplastic layer 514 is in the second state 514-2, removable lens 406 can be separated from optical assembly 510 because the shrinking of the oriented thermoplastic reduces adhesive properties of the adhesive layer of thermally sensitive adhesive layer 512 and/or the surface area of adhesive bonding.

Figure 5C:
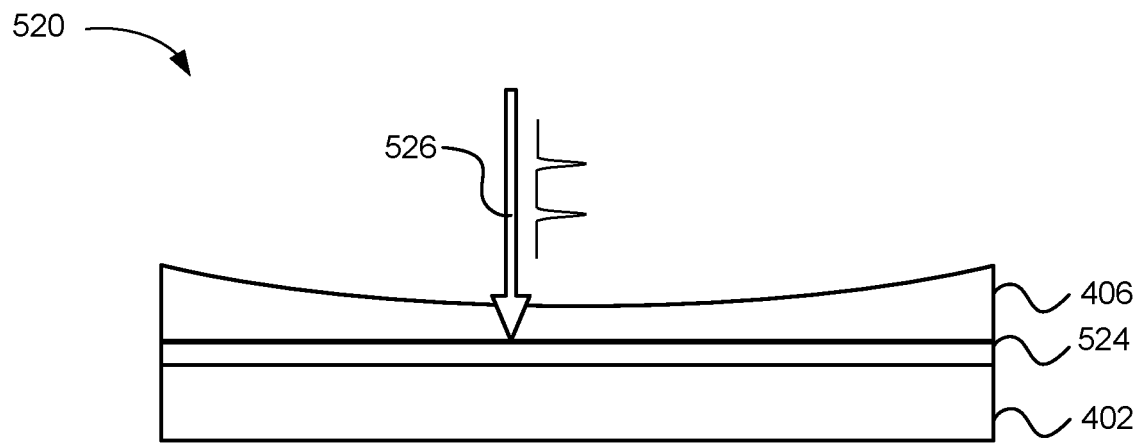
FIG. 5C is a schematic diagram illustrating an optical assembly with a removable lens in accordance with some embodiments.

FIG. 5C is a schematic diagram illustrating optical assembly 520 with removable lens 406 in accordance with some embodiments. Optical assembly 520 is similar to optical assembly 400 described above with respect to FIGS. 4A and 4B except that optical assembly 520 includes adhesive layer 524 between substrate 402 and removable lens 406. In some embodiments, adhesive layer 524 includes a thermally sensitive adhesive layer. The thermally sensitive adhesive layer is configured to undergo thermal degradation when exposed to sufficiently high intensity of a pulsed light (e.g., pulsed laser light 526). In some cases, the thermal degradation leads to additional absorption of the laser light. In some embodiments, an intense laser light may cause nonlinear absorption (e.g., multi-photon absorption) in adhesive layer 524. For example, a pico- or femtosecond duration infrared laser pulses focused on a boundary region between thermally sensitive adhesive layer 524 and substrate 402 or removable lens 406 may cause nonlinear absorption at the focal point, in which multiple photons of an infrared wavelength are absorbed to break bonds that are typically susceptible to ultraviolet light. The degradation of adhesive layer 524 at the boundary region allows removal of removable lens 406 without damaging substrate 402.

In alternative embodiments, adhesive layer 524 includes thermally sensitive adhesive material that changes its adhesive properties when cooled down below a threshold temperature. In such embodiments, removable lens 406 becomes removable from optical assembly 520 by exposing adhesive layer 524 to a temperature below the threshold temperature of −40 Celsius degrees for, for example, alkyl acrylate-acrylic acid copolymers. In some cases, the threshold temperature corresponds to a glass transition temperature of the thermally sensitive adhesive layer. Glass transition temperature refers to a temperature below which the physical properties of polymers change to those of a glassy or crystalline materials (e.g., the polymers become brittle).

Figure 5D:
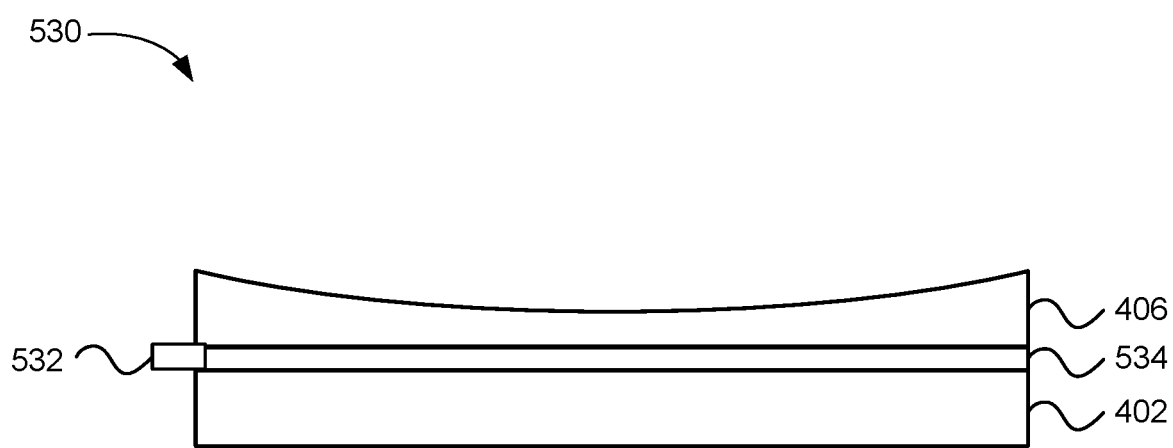
FIG. 5D is a schematic diagram illustrating an optical assembly with a removable lens in accordance with some embodiments.

FIG. 5D is a schematic diagram illustrating optical assembly 530 with removable lens 406 in accordance with some embodiments. Optical assembly 530 is similar to optical assembly 400 described above with respect to FIGS. 4A and 4B except that in optical assembly 530, removable lens 406 and substrate 402 are coupled with a combination of tack 532 and weak adhesive layer 534. Weak adhesive layer 534 is positioned between substrate 402 and removable lens 406. Weak adhesive layer 534 is configured to provide some level of adhesive bonding to hold removable lens 406 and substrate 402 together. Materials suitable for weak adhesive layer 534 include silicone adhesives, and particle-filled acrylic, epoxy, silicone, and urethane adhesives. In some embodiments, the particles have diameters between 10 and 100 micrometer, and have a similar refractive index and dispersion as the weak adhesive material. Tack 532 positioned near an edge region of optical assembly 530 is instead configured to provide a secured, rigid coupling of removable lens 406 and substrate 402. In some embodiments, tack 532 includes UV curable acrylic or other rigid polymer. Removable lens 406 can be decoupled from substrate 402 by, for example, mechanical force. Weak adhesive layer 534 having merely a weak bonding (e.g., comparable to a double-sided tape) with removable lens 406 and substrate 402 can be removed without causing any damage to lens 406 and substrate 402. Pulling tack 532 apart instead may leave residue and/or cause damage to the edge region of optical assembly 530. However, the edge region does not affect optical properties of optical assembly 530 and the damage to the edge region is therefore not significant. The combination of weak adhesive layer 534 and tack 532 therefore provides for decoupling of removable lens 406 without damaging at least a central portion (e.g., a portion in a field of view of a user) of substrate 402 and removable lens 406.

Figure 5E:
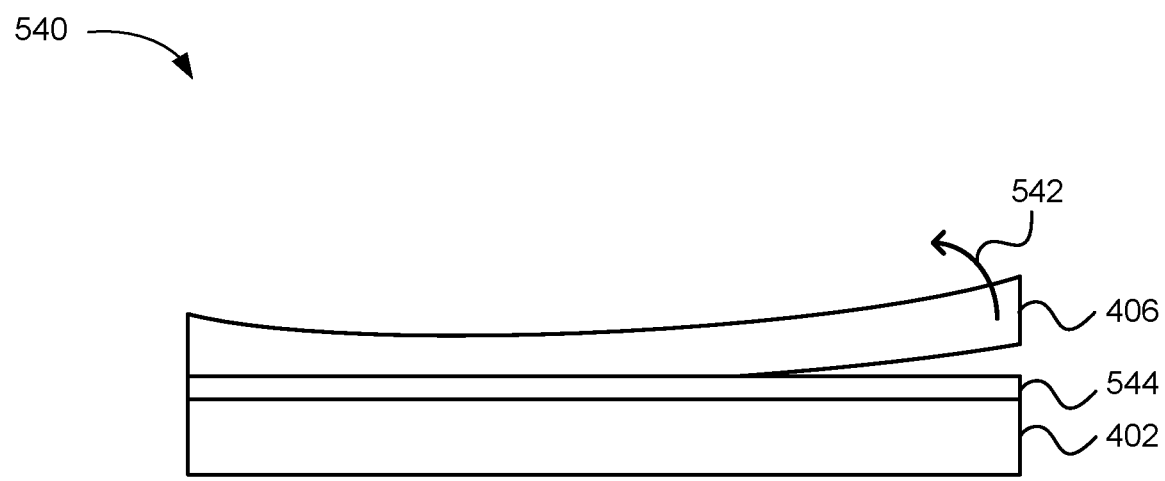
FIG. 5E is a schematic diagram illustrating an optical assembly with a removable lens in accordance with some embodiments.

FIG. 5E is a schematic diagram illustrating optical assembly 540 with removable lens 406 in accordance with some embodiments. Optical assembly 540 is similar to optical assembly 400 described above with respect to FIGS. 4A and 4B except that optical assembly 540 includes adhesive layer 544 between substrate 402 and removable lens 406. In optical assembly 540, removable lens 406 can be decoupled from adhesive layer 544 or substrate 402 by mechanical force 542. The mechanical force causes at least one of: adhesive failure or cohesive failure of adhesive layer 544. A cohesive failure refers to a failure in a bulk layer of an adhesive layer thereby causing release from an adherent (the material being bonded to). An adhesive failure refers to a failure at an interface between the one or more adhesive layers and the adherent. Adhesive layer 544 of optical assembly 540 includes adhesive material configured to undergo a cohesive and/or an adhesive failure upon exposure to mechanical force 542. Suitable adhesives materials for adhesive layer 544 include pressure-sensitive adhesives or cured adhesives including acrylics, epoxies, silicones, and urethane materials.

In some embodiments, a method of removing lens 406 from an optical assembly (e.g., the optical assemblies described with respect to any of the FIGS. 5A-5E) further includes removing any residual adhesive material that may be on substrate 402. The residual adhesive material may be removed, for example, by stripping or by application of a solvent. In embodiments where a solvent is used, substrate 402 is made of a solvent-resistant material, such as a cross-linked polymer, glass, sapphire, or any other solvent-resistant material.

FIG. 6 is a schematic illustration of display device 620 with eye tracking device 600 in accordance with some embodiments. In some embodiments, display device 620 is a head-mounted display device (e.g., display device 100 in FIG. 1). Eye tracking device 600 includes optical detector 612, one or more light sources (e.g., light sources 606-1 and 606-2), combiner 608, and lens 602. Eye tracking device 600 is configured to provide light (e.g., light 610-1) for illuminating eye 340 (e.g., an eye of a user of a head-mounted device) and detect light (e.g., light 610-2) reflected off a surface of eye 340 for determining a position of pupil 350 of eye 340 (or a gaze direction of eye 340). In some embodiments, eye tracking device 600 is part of, or in communication with, eye tracking module 217 described above with respect to FIG. 2.

In FIG. 6, light sources 606-1 and 606-2 are positioned between combiner 608 and lens 602. Light sources 606-1 and 606-2 are configured to project light 610-1 (e.g., a light pattern) toward eye 340. In some embodiments, light 610-1 is infrared light and therefore not visible to eye 340. Light sources 606-1 and 606-2 include one or more LEDs, one or more microLEDs, one or more OLEDs, one or more lasers, or one or more vertical-cavity surface emitting lasers (VCSEL). In some embodiments, light sources 606-1 and 606-2 are embedded in a substrate (e.g., substrate 607). In some embodiments, substrate 607 corresponds to substrate 402 described above with respect to FIGS. 4A and 4B. In FIG. 6, light sources 606-1 and 606-2 are positioned in a field of view of eye 340. Alternatively, light sources 606-1 and 606-2 may be positioned away from the field of view of eye 340. For example, light sources 606-1 and 606-2 can be positioned around lens 602 coupled with a frame of the head-mounted display device (see, FIGS. 7A and 7B).

Light 610-1 projected by light source 606-1 is reflected off a surface of eye 340 as light 610-2. Light 610-2 is received by combiner 608. A combiner is a partial reflector configured to redirect (e.g., reflect) a first light while transmitting a second light distinct from the first light. In some embodiments, combiner 608 is a polarization selective reflector (e.g., a polarization volume hologram or a reflective polarizer). A polarization selective reflector is configured to reflect light having a first polarization while transmitting light having polarization distinct from (e.g., orthogonal to) the first polarization. In some embodiments, combiner 608 is a wavelength selective reflector (e.g., a dichroic filter, such as a hot mirror). A wavelength selective reflector is configured to reflect light having a first wavelength range (e.g., infrared light) while transmitting light (e.g., visible light) having a wavelength range outside the first wavelength range. Combiner 608 redirects at least a portion of light 610-2 toward optical detector 612, and transmits at least a portion of light projected by a display panel (e.g., light 624 projected by optical waveguide 622-1) toward eye 340. In some embodiments, combiner 608 also transmits ambient light 626 from outside of display device 620.

Optical detector 612 (e.g., an infrared sensitive camera or photodiode) is configured to detect light 610-3 redirected by combiner 608. In FIG. 6, optical detector 612 is positioned away from an optical axis 628 of lens 602 and facing lens 602 (e.g., optical detector 612 is positioned in a temple of a head-mounted display device). A position of pupil 350 of eye 340 is determined based on the detected light 610-3 (e.g., by eye tracking module 217).

In FIG. 6, lens 602 is positioned between the light sources 606-1 and 606-2 and eye 340. In some embodiments, lens 602 is positioned adjacent to light sources 606-1 and 606-2 (e.g., at a distance less than 10 mm, 8 mm, 6 mm, 5 mm, 4 mm, 3 mm, 2 mm, 1 mm, or 500 μm).

In some embodiments, lens 602 is a removable lens corresponding to removable lens 406 described above with respect to FIGS. 4A and 4B. In some embodiments, lens 602 is removably coupled to eye tracking device 600 (e.g., to a surface of substrate 607) by adhesive layer 604. Adhesive layer 604 corresponds to any of the adhesive layers described above with respect to FIGS. 5A-5E. In some embodiments, lens 602 is permanently (or non-removably) coupled to substrate 607. In such embodiments, lens 602 may be replaced by swapping out a first stack of (first) lens 602 and (first) substrate 607 with light sources 606-1 and 606-2 with a second stack of a second lens and a second substrate with light sources.

In some other embodiments, lens 602 is coupled to eye tracking device 600 mechanically. For example, removable lens 602 is coupled to eye tracking device 600 by a mechanical mount (e.g., a barrel mount, C-mount, or T-mount). In such embodiments, adhesive layer 604 is replaced with air or some other low refraction index material.

In some embodiments, eye tracking device 600 includes, instead of removable lens 602, removable lens 614 positioned adjacent to a display panel (e.g., optical waveguide 622-1). In some embodiments, the display panel (e.g., optical waveguide 622-1) is positioned between removable lens 614 and eye 340 (or combiner 608). Removable lens 614 is coupled to an optical substrate (e.g., optical waveguide 622-1) by adhesive layer 616 in a manner analogous to the adhesive layers described herein with respect to FIGS. 5A-5E. In such embodiment, combiner 608 and light sources 606-1 and 606-2 are positioned between removable lens 614 and eye 340 (and the display panel is positioned between removable lens 614 and combiner 608). Such configuration may facilitate alignment of the optical components of the eye tracker, because eye tracking light (e.g., light 610-1, 610-2, and 610-3) is not transmitted through a removable lens. In some embodiments, eye tracking device 600 includes both removable lens 602 and removable lens 614. In such embodiment, combiner 608 and light sources 606-1 and 606-2 are positioned between removable lens 602 and removable lens 614.

In some embodiments, the stack of lens 602 and substrate 607 with light sources 606-1 and 606-2 include one or more electrical connectors. In some embodiments, at least a subset of the one or more electrical connectors is used for providing power to light sources 606-1 and 606-2. In some embodiments, at least a subset of the one or more electrical connectors is coupled to a series of resistors or an electrically readable storage medium, such as an erasable programmable read-only memory (EPROM) microchip, for providing an identification information (e.g., a serial number). In some embodiments, the identification information includes information identifying lens 602, and such identification information may be used for calibration of optical detector 612. For example, the calibration may take into account a thickness of the identified lens 602. Additionally, the identification information may include information identifying a position of lens 602 for adaptive calibration of eye tracking device 600. Alternatively, the identification information may be provided on the stack as an optically readable marker, such as a fiducial marker or a matrix barcode. In some embodiments, the optically readable marker may be illuminated by a separate IR illuminator or by the eye tracking light sources 606-1 and/or 606-2.

In some embodiments, as shown in FIG. 6, eye tracking device 600 is integrated into display device 620, which is an augmented reality, mixed reality, or virtual reality head-mounted display device. Eye tracking device 600 is thereby positioned adjacent to one or more display panels, such as optical waveguides 622-1 and 622-2. The waveguides are configured to receive image light from an image source (not shown) and redirect at least portions of the image light (e.g., light 624) toward eye 340. In some embodiments, the waveguides are further configured to transmit at least a portion of ambient light (e.g., ambient light 626) such that display device 620 may operate as an augmented reality or mixed reality display device. As described above, in some embodiments, display device 620 includes, instead of or in addition to removable lens 602, removable lens 614 positioned adjacent to optical waveguide 622-1. In some embodiments, removable lens 614 is configured to reduce optical artifacts (e.g., chromatic aberrations) arising from transmission of ambient light 626 from outside of display device 620 through optical waveguides 622-1 and 622-2 and eye tracking device 600. Although FIG. 6 illustrates display device 620 with two optical waveguides 622-1 and 622-2, display device 620 may include fewer (e.g., one) or more (e.g., three, four, etc.) optical waveguides in some other embodiments.

In some embodiments, eye tracking device 600 is optically coupled with an opaque display panel instead of the one or more waveguides. The display panel projects virtual reality images to eye 340. In some embodiments, the display panel corresponds to light emission device 310 described above with respect to FIG. 3 and is configured to project image light toward eye 340.

Figure 7B:
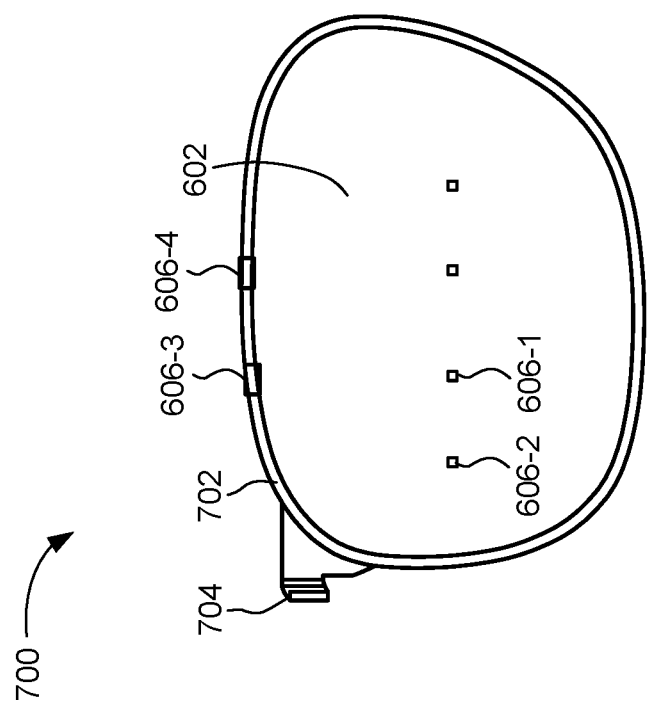
FIGS. 7A and 7B are schematic illustrations of a portion of a head-mounted display device in accordance with some embodiments.
Figure 7A:
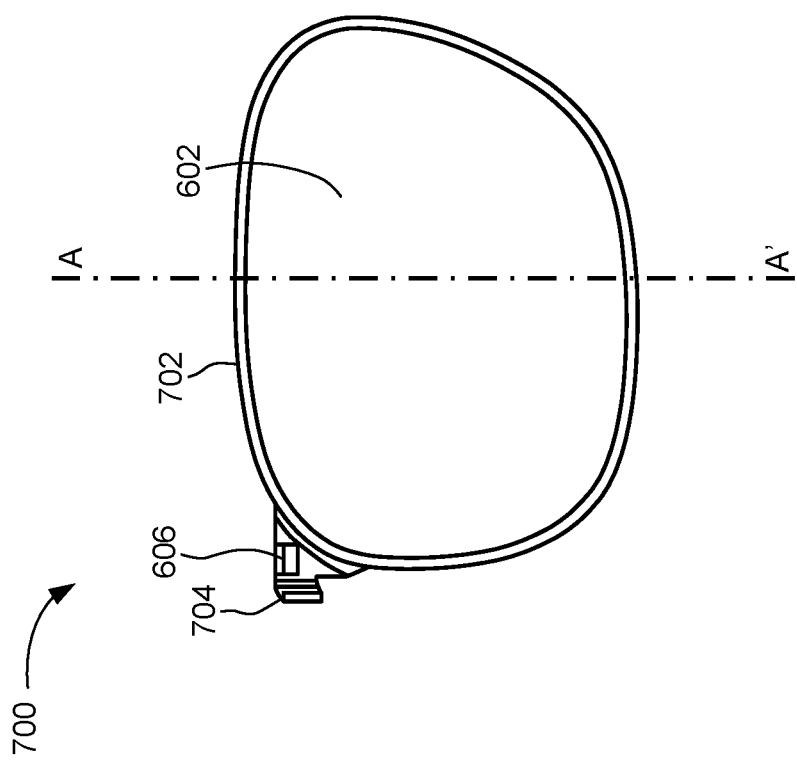

FIGS. 7A and 7B are schematic illustrations of head-mounted display device 700 in accordance with some embodiments. In some embodiments, head-mounted display device 700 corresponds to display device 620 with eye tracking device 600 as shown in FIG. 6. FIGS. 7A and 7B show a front view of display device 700 illustrating lens 602 coupled with rim 702. In FIG. 7A, display device 700 includes a single light source 606 positioned away from a field of view of display device 700 (e.g., in end piece 704 of a frame of display device 700). In FIG. 7B, display device 700 includes one or more light sources (e.g., light sources 606-1 and 606-2) positioned in a central area of lens 602 (e.g., in a field of view of a user) as well as one or more light sources (e.g., light sources 606-3 and 606-4 on rim 702) positioned around removable lens 602. In some embodiments, display device 700 includes one or more light sources positioned in the field of view without light sources on rim 702. In some embodiments, display device 700 includes one or more light sources positioned on rim 702 without one or more light sources positioned in the field of view.

In light of these principles, we now turn to certain embodiments.

In accordance with some embodiments, an optical assembly includes an optically transparent substrate (e.g., substrate 402 in FIG. 4A) and a first lens (e.g., removable lens 406) removably coupled with the optically transparent substrate by one or more adhesive layers (e.g., adhesive layer 404). The one or more adhesive layers are positioned between the optically transparent substrate and the first lens. In some embodiments, the first lens is a prescription lens having optical parameters (e.g., diopter parameters) specific to a user of a display device. A prescription lens refers to a custom lens having parameters in accordance to a prescription determined by an eyewear prescriber (e.g., an optician, an optometrist, or an ophthalmologist).

In some embodiments, the one or more adhesive layers extend at least partially across the optically transparent substrate and between the optically transparent substrate and the first lens (e.g., FIG. 4A).

In some embodiments, the one or more adhesive layers includes a light absorbing polymer (e.g., light absorbing adhesive layer 504 in FIG. 5A) that absorbs light at a first wavelength range. The one or more adhesive layers are configured be releasable from at least one of the first lens or the optically transparent substrate upon exposure to light (e.g., light 502) having the first wavelength range. In some embodiments, the first wavelength range corresponds to UV wavelength range.

In some embodiments, the one or more adhesive layers include polymer selected from epoxy, acrylate, urethane, ester, aliphatic hydrocarbon, and aromatic hydrocarbon.

In some embodiments, the one or more adhesive layers (e.g., thermally sensitive adhesive layer 512 in FIG. 5B) are configured to be releasable, upon exposure to altered temperature (e.g., a temperature that is outside a room temperature range), from at least one of: the first lens or the optically transparent substrate. For example, exposure to a low temperature causes thermally sensitive adhesive layer 512 to become releasable or released from the first lens or the optically transparent substrate. In some embodiments, exposing the one or more adhesive layers to altered temperature includes exposing the one or more adhesive layers to a temperature below glass transition temperature of the one or more adhesive layers.

In some embodiments, the one or more adhesive layers include a first adhesive layer and a thermoplastic material. In some embodiments, the thermoplastic material is an oriented thermoplastic material.

In some embodiments, the oriented thermoplastic material is selected from a group consisting of: polyolefin (e.g., polypropylene and polyethylene), polyester (e.g., polyethylene terephthalate and polyethylene naphthalate), or polyurethane.

In some embodiments, the oriented thermoplastic material is configured to shrink upon exposure to heating (e.g., shrunk thermally sensitive adhesive layer 512 in FIG. 5B). In some embodiments, the one or more adhesive layers include a second adhesive layer. The first adhesive layer and the second adhesive layer include pressure sensitive adhesive material, or adhesive material that is cured thermally or by radiation.

In some embodiments, the one or more adhesive layers (e.g., adhesive layer 524 in FIG. 5C) are configured to be releasable from at least one of the first lens or the optically transparent substrate upon exposure to a series of laser pulses (e.g., laser light 526). In some embodiments, the laser pulses are pico- or femtosecond laser pulses with a particular wavelength range. For example, the series of laser pulses causes thermal degradation of the one or more adhesive layers.

In some embodiments, the one or more adhesive layers (e.g., adhesive layer 544 in FIG. 5E) are configured to be releasable from at least one of the first lens or the optically transparent substrate upon exposure to a mechanical force (e.g., mechanical force 542) that causes at least one of adhesive or cohesive failure of the one or more adhesive layers. A cohesive failure refers to a failure in a bulk layer of an adhesive layer thereby causing release from an adherent (e.g., the material being bonded to). An adhesive failure refers to a failure at an interface between the one or more adhesive layers and the adherent.

In some embodiments, the one or more adhesive layers are configured to be releasable from at least one of: the first lens or the optically transparent substrate upon exposure to actinic radiation that causes degradation of the one or more adhesive layers (e.g., FIG. 5A). Actinic radiation refers to electromagnetic radiation capable of producing photochemical reactions in the one or more adhesive layers thereby modifying adhesive properties (e.g., decreasing adhesiveness) of the one or more adhesive layers.

In some embodiments, the optically transparent substrate (e.g., substrate 402 in FIG. 4A) is a waveguide (e.g., optical waveguide 622-1 in FIG. 6), an optical combiner (e.g., combiner 608 in FIG. 6), or a second lens. In some embodiments, the optically transparent substrate is a portion of a display device (e.g., display device 620).

In some embodiments, the optically transparent substrate includes an optical combiner (e.g., combiner 608 in FIG. 6) configured to transmit at least a first portion of received light (e.g., light 624 from optical waveguide 622-1) and redirect a second portion of the received light (e.g., light 610-2 reflected off a surface of eye 340).

In accordance with some embodiments, an eye tracking device includes the optical assembly described above. The optically transparent substrate includes one or more illumination sources configured to provide light to an eye of a user (e.g., substrate 607 includes light sources 606-1 and 606-2 in FIG. 6). The eye tracking device also includes a detector (e.g., optical detector 612) configured to receive light reflected off the eye of the user (e.g., light 610-2 reflected off a surface of eye 340) for determining a position of a pupil of the eye of the user.

In accordance with some embodiments, a display device includes a display panel (e.g., display device 620 includes optical waveguide 622-1 in FIG. 6) and the eye tracking device described above (e.g., eye tracking device 600). The eye tracking device also includes an optical combiner (e.g., combiner 608) configured to transmit light (e.g., light 624) from the display panel toward the eye of the user and redirect light reflected off the eye of the user toward the detector.

In some embodiments, the display device also includes a second lens (e.g., removable lens 614) so that the optically transparent substrate is located between the first lens and the second lens.

In accordance with some embodiments, a method includes separating the first lens from the optical assembly described above by separating the first lens from the optically transparent substrate. The method also includes removably coupling a third lens that is distinct from the first lens with the optically transparent substrate (e.g., FIGS. 4A and 4B).

In some embodiments, removably coupling the third lens with the optically transparent substrate includes providing an adhesive layer between the optically transparent substrate and the third lens (e.g., so that the adhesive layer comes in contact with both the third lens and the optically transparent substrate as shown in FIG. 4A).

In some embodiments, the method further includes, prior to separating the first lens from the optically transparent substrate, exposing the one or more adhesive layers to one or more of light at a first wavelength range, pulsed light having a peak intensity above a predefined intensity threshold, a temperature within one or more predefined temperature ranges, a tensile force above a predefined force threshold, or actinic radiation above a predefined actinic radiation threshold (e.g., FIGS. 5A-5E).

Although various drawings illustrate operations of particular components or particular groups of components with respect to one eye, a person having ordinary skill in the art would understand that analogous operations can be performed with respect to the other eye or both eyes. For brevity, such details are not repeated herein.

Although some of various drawings illustrate a number of stages in a particular order, stages which are not order dependent may be reordered and other stages may be combined or broken out. While some reordering or other groupings are specifically mentioned, others will be apparent to those of ordinary skill in the art, so the ordering and groupings presented herein are not an exhaustive list of alternatives.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. For example, in accordance with some embodiments, a display device includes a display panel and an eye tracking device. The eye tracking device includes a removable stack of a lens and an optically transparent substrate with one or more illumination sources, where the optically transparent substrate is (non-removably) coupled with the lens. The embodiments were chosen in order to best explain the principles underlying the claims and their practical applications, to thereby enable others skilled in the art to best use the embodiments with various modifications as are suited to the particular uses contemplated.

What is claimed is:

1. An optical assembly, comprising:
an optically transparent substrate, wherein the optically transparent substrate is a waveguide or an optical combiner; and
a first lens removably coupled with the optically transparent substrate by one or more adhesive layers positioned between the optically transparent substrate and the first lens and extending across surfaces of the optically transparent substrate and the first lens.

2. The optical assembly of claim 1, wherein the one or more adhesive layers extend at least partially across the optically transparent substrate and between the optically transparent substrate and the first lens.

3. The optical assembly of claim 1, wherein:
the one or more adhesive layers includes a light absorbing polymer that absorbs light at a first wavelength range; and
the one or more adhesive layers are configured be releasable from the first lens and/or the optically transparent substrate upon exposure to light having the first wavelength range.

4. The optical assembly of claim 3, wherein:
the one or more adhesive layers include polymer selected from epoxy, acrylate, urethane, ester, aliphatic hydrocarbon, and aromatic hydrocarbon.

5. The optical assembly of claim 1, wherein:
the one or more adhesive layers are configured to be releasable from at least one of: the first lens or the optically transparent substrate upon exposure to altered temperature.

6. The optical assembly of claim 5, wherein:
the one or more adhesive layers include a first adhesive layer and a thermoplastic material; and
the thermoplastic material is an oriented thermoplastic material.

7. The optical assembly of claim 6, wherein the oriented thermoplastic material is selected from a group consisting of: polyolefin, polyesters, and polyurethane.

8. The optical assembly of claim 6, wherein the oriented thermoplastic material is configured to shrink upon exposure to heating.

9. The optical assembly of claim 1, wherein:
the one or more adhesive layers are configured to be releasable from at least one of: the first lens or the optically transparent substrate upon exposure of the one or more adhesive layers to a series of laser pulses transmitted through the optically transparent substrate.

10. The optical assembly of claim 1, wherein:
the one or more adhesive layers are configured to be releasable from at least one of: the first lens or the optically transparent substrate, upon exposure to a mechanical force that causes at least one of: adhesive or cohesive failure of the one or more adhesive layers.

11. The optical assembly of claim 1, wherein:
the one or more adhesive layers are configured to be releasable from at least one of: the first lens or the optically transparent substrate upon exposure to actinic radiation that causes degradation of the one or more adhesive layers.

12. The optical assembly of claim 1, wherein:
the optically transparent substrate includes an optical combiner configured to transmit at least a first portion of received light and redirect a second portion of the received light.

13. An optical assembly, comprising:
an optically transparent substrate; and
a first lens removably coupled with the optically transparent substrate by one or more adhesive layers positioned between the optically transparent substrate and the first lens, wherein:
the optically transparent substrate includes one or more infrared illumination sources.

14. An eye tracking device, comprising:
the optical assembly of claim 1, wherein the optically transparent substrate includes one or more illumination sources configured to provide light to an eye of a user; and
a detector configured to receive light reflected off the eye of the user for determining a position of a pupil of the eye of the user.

15. A display device, comprising:
a display panel; and
the eye tracking device of claim 14, wherein the eye tracking device also includes an optical combiner configured to transmit light from the display panel toward the eye of the user and redirect light reflected off the eye of the user toward the detector.

16. The display device of claim 15, further comprising:
a second lens so that the optically transparent substrate is located between the first lens and the second lens.

17. A method, comprising:
separating the first lens from the optical assembly of claim 1 by separating the first lens from the optically transparent substrate; and
removably coupling a third lens that is distinct from the first lens with the optically transparent substrate.

18. The method of claim 17, further comprising:
prior to separating the first lens from the optically transparent substrate, exposing the one or more adhesive layers to one or more of: light at a first wavelength range, pulsed light having a peak intensity above a predefined intensity threshold, a temperature within one or more predefined temperature ranges, a tensile force above a predefined force threshold, actinic radiation above a predefined actinic radiation threshold.

19. The method of claim 17, wherein:
removably coupling the third lens with the optically transparent substrate includes providing an adhesive layer between the optically transparent substrate and the third lens.

20. The optical assembly of claim 1, wherein the optically transparent substrate includes one or more illumination sources.

* * * * *